(No Model.)

F. C. ROBINSON.
FORMALDEHYDE GENERATOR.

No. 593,123. Patented Nov. 2, 1897.

WITNESSES:

INVENTOR
F. C. Robinson.
BY
ATTORNEYS.

UNITED STATES PATENT OFFICE.

FRANKLIN C. ROBINSON, OF BRUNSWICK, MAINE.

FORMALDEHYDE-GENERATOR.

SPECIFICATION forming part of Letters Patent No. 593,123, dated November 2, 1897.

Application filed November 3, 1896. Serial No. 610,916. (No model.)

*To all whom it may concern:*

Be it known that I, FRANKLIN C. ROBINSON, of Brunswick, in the county of Cumberland and State of Maine, have invented a new and Improved Apparatus for Generating Formaldehyde, of which the following is a full, clear, and exact description.

My invention relates to that method of generating formaldehyde in which methylic alcohol or wood-spirit is oxidized into formaldehyde by passing the vapors of methylic alcohol with an admixture of air through a heated and porous septum formed of or containing a metal or metallic compound.

For convenient portable use in generating this powerful disinfectant a lamp has heretofore been constructed, comprising a fount in the base for the wood-spirit, into which a wick is allowed to dip, an oxidizing-chimney above the wick having a platinized asbestos diaphragm in it, with air-inlets below the diaphragm. My invention is designed to provide a portable apparatus of this general principle of operation, but which shall act more rapidly and yield a larger volume of the antiseptic, and at the same time be more convenient in use, more easily taken apart and cleaned, and be more perfectly regulated in its action; and to these ends it consists in the special construction and arrangement of the apparatus which I will now proceed to describe.

Reference is to be had to the accompanying drawings, forming a part of this specification, in which similar characters of reference indicate corresponding parts in all the figures.

Figure 1:
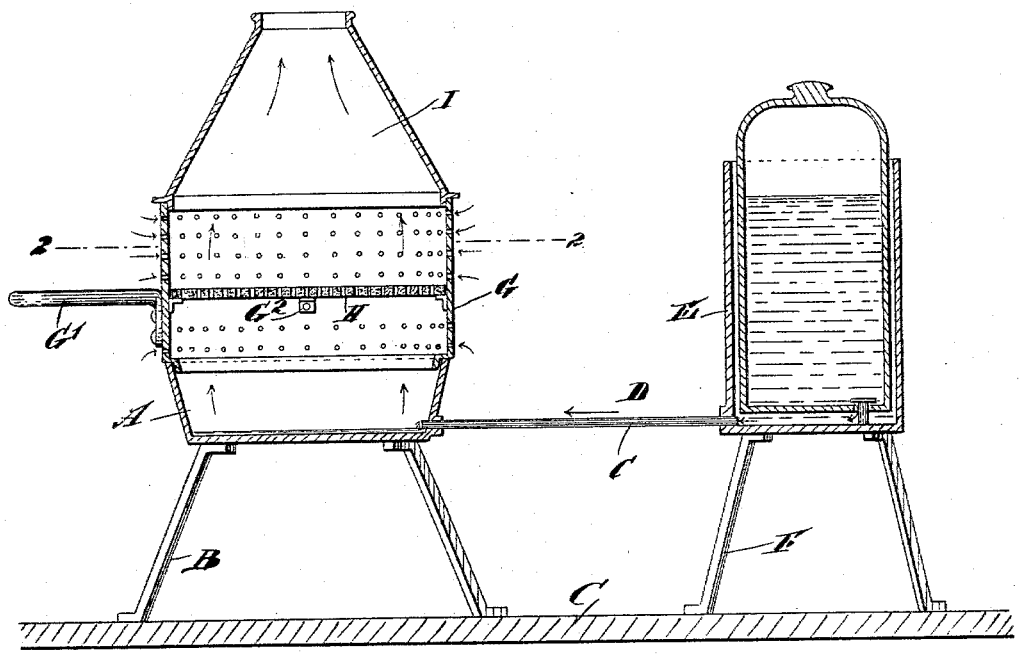
Figure 2:
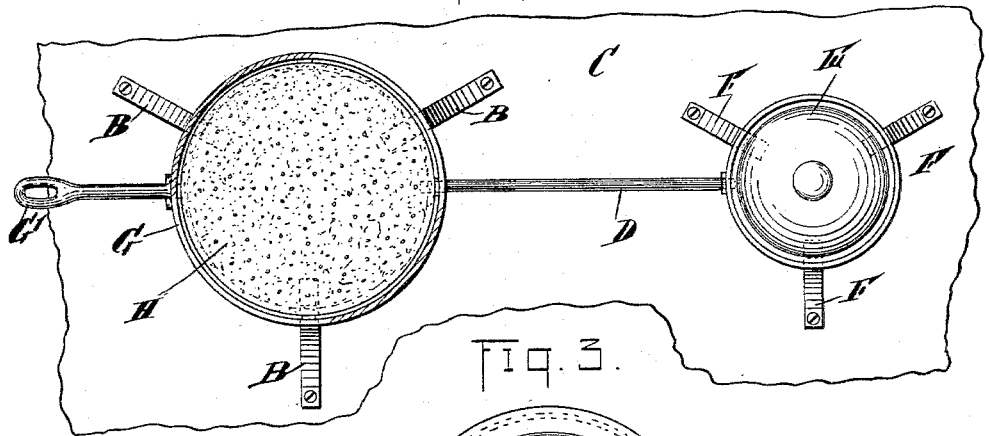
Figure 3:
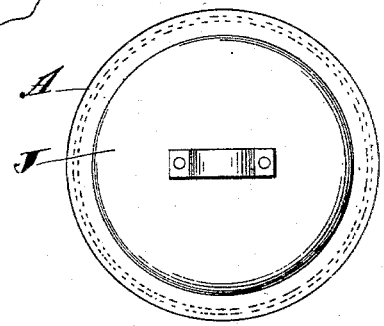

Figure 1 is a sectional side elevation of the apparatus. Fig. 2 is a sectional plan view of the same on the line 2 2 of Fig. 1, and Fig. 3 is a plan view of the shallow vessel or pan closed by a cover.

The apparatus for generating formaldehyde is provided with a shallow vessel or pan A, held on suitable legs B, preferably attached to a base C, as indicated in Figs. 1 and 2. The bottom of the pan A is connected by a supply-pipe D with a tank E, set on legs F, and containing an automatic feed device, comprising a holder with valve in its bottom, after the manner of the "student-lamp," for feeding the wood-spirit, so that the latter flows by its own gravity through the pipe D into the pan A, to spread on the bottom thereof in a very thin layer which remains constant without flooding the pan. On the top of the pan A is adapted to be set a perforated shell G, provided with a handle G' and carrying at its inside a number of lugs G² for supporting a perforated plate H, made of asbestos or other non-combustible material, impregnated with platinum, copper, or other metal, in powder form, or a metallic salt or oxid. The upper end of the shell G is provided with a cone-shaped outlet I for the gaseous formaldehyde to pass into the room in which the apparatus is located.

Now in order to generate the gaseous formaldehyde the operator by taking hold of the handle G' first removes the shell G, with the plate H and outlet I, from the pan A and then ignites the wood-spirit contained in the pan. The operator then replaces the shell G and its parts on the pan A, so that the burning wood-spirit heats the shell and principally the plate H to, say, a temperature of dull redness. When this has been done, the operator again removes the shell G from the pan A and covers the latter with a lid J to extinguish the flame. The cover is then removed from the pan A and the shell G is replaced thereon to permit the vapors of the wood-spirit, constantly fed into the pan A in a thin layer, as previously mentioned, to pass up and through the plate H, with air passing through the perforations in the shell G, so that the mixture of air and vapors coming in contact with the metal contained in the plate H produces formaldehyde, which passes up through the upper portion of the shell and the outlet I into the room.

The heat of the diaphragm H is maintained by the chemical action or catalytic effect involved in the oxidation of the wood-spirit, so that the process is continuous after being started, the radiant and conducted heat of the diaphragm being sufficient to continue the evaporation from the thin film of liquid in the pan A, whose level is constantly maintained by the automatic feed device.

It is well known that formaldehyde is a very powerful germ-destroyer, and as it can be produced by this apparatus in very large quantities it will be very effective in thoroughly fumigating sick-rooms and the like.

Instead of the perforated plate H shown, I may employ a strip of asbestos rolled up into a spiral, with the layers slightly separated.

The distinctive novelty and merit of my invention are to be found in displacing the slowly-evaporating wick heretofore employed and employing a relatively large open pan in connection with automatic feed-supply devices which maintains a thin film of the wood-spirit in the pan, which film is rapidly evaporated by conduction and radiant heat from the diaphragm directly above and overspreading the same, whereby a rapid and profuse generation of the antiseptic is obtained in a direct and unobstructed manner.

Having thus fully described my invention, I claim as new and desire to secure by Letters Patent—

1. An apparatus for generating formaldehyde, comprising a shallow pan, an automatic feed device for supplying and maintaining a thin film of wood-spirit in the pan, an oxidizing-chamber arranged above the pan, and a pervious catalytic diaphragm arranged in the oxidizing-chamber directly above the pan, substantially as and for the purpose described.

2. An apparatus for generating formaldehyde, comprising a shallow pan, an automatic feed device for supplying and maintaining a thin film of wood-spirit in the pan, a perforated detachable shell forming an oxidizing-chamber arranged above the pan, a pervious catalytic diaphragm arranged in the oxidizing-chamber directly above the pan with a free open space between it and the pan, substantially as and for the purpose described.

3. An apparatus for generating formaldehyde, comprising a shallow pan, an automatic feed device for supplying and maintaining a thin film of wood-spirit in the pan, a perforated detachable shell forming an oxidizing-chamber arranged above the pan, a pervious catalytic diaphragm arranged in the oxidizing-chamber immediately above the pan, and a detachable conical top piece for the oxidizing-chamber, substantially as and for the purpose described.

FRANKLIN C. ROBINSON.

Witnesses:
B. L. BRYANT,
E. D. ARMSTRONG.